(12) United States Patent
Kim

(10) Patent No.: US 10,228,037 B2
(45) Date of Patent: Mar. 12, 2019

(54) COMPRESSION-TYPE MASS DAMPER, AND SUSPENSION SYSTEM AND VEHICLE USING THE SAME

(71) Applicant: Hyundai Motor Company, Seoul (KR)

(72) Inventor: Tae-Hyung Kim, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 159 days.

(21) Appl. No.: 15/264,800

(22) Filed: Sep. 14, 2016

(65) Prior Publication Data

US 2017/0167560 A1 Jun. 15, 2017

(30) Foreign Application Priority Data

Dec. 14, 2015 (KR) ........................ 10-2015-0177944

(51) Int. Cl.
| | | |
|---|---|---|
| *B60G 9/00* | (2006.01) | |
| *B60G 11/10* | (2006.01) | |
| *F16F 7/108* | (2006.01) | |
| *B60B 35/12* | (2006.01) | |
| *B60G 9/02* | (2006.01) | |
| *B60G 13/16* | (2006.01) | |
| *B60G 15/04* | (2006.01) | |
| *B60G 11/04* | (2006.01) | |

(52) U.S. Cl.
CPC ............. *F16F 7/108* (2013.01); *B60B 35/12* (2013.01); *B60G 9/003* (2013.01); *B60G 9/02* (2013.01); *B60G 11/04* (2013.01); *B60G 13/16* (2013.01); *B60G 15/04* (2013.01); *B60G 2200/32* (2013.01); *B60G 2202/112* (2013.01); *B60G 2800/162* (2013.01); *F16F 2222/08* (2013.01); *F16F 2224/025* (2013.01); *F16F 2226/04* (2013.01); *F16F 2226/045* (2013.01); *F16F 2236/04* (2013.01)

(58) Field of Classification Search
CPC ........ B60G 9/003; B60G 11/10; B60G 11/04; F16F 7/108
See application file for complete search history.

(56) References Cited

U.S. PATENT DOCUMENTS

| | | | | |
|---|---|---|---|---|
| 4,519,590 A | * | 5/1985 | Wells ................... | B60G 11/113 267/149 |
| 4,801,129 A | * | 1/1989 | Wells ................... | B60G 11/113 267/158 |
| 8,360,454 B2 | * | 1/2013 | Fruhmann ............. | B60G 11/08 267/7 |

(Continued)

FOREIGN PATENT DOCUMENTS

| | | |
|---|---|---|
| JP | 06-264961 | 9/1994 |
| JP | 06264961 A * | 9/1994 |
| JP | H08247213 A | 9/1996 |

(Continued)

*Primary Examiner* — Faye M Fleming
(74) *Attorney, Agent, or Firm* — Mintz Levin Cohn Ferris Glovsky and Popeo, P.C.; Peter F. Corless

(57) ABSTRACT

A compression-type mass damper may include a damping mass formed with an open space, the damping mass enclosing an outer surface of a target through the open space and absorbing vibration of the target, a weight body enclosed by the damping mass, the weight body applying weight to the damping mass, and
a compression plate enclosed by the damping mass, the compression plate applying a fixing force to the open space.

21 Claims, 6 Drawing Sheets

(56) References Cited

U.S. PATENT DOCUMENTS

| | | | |
|---|---|---|---|
| 9,278,596 B2* | 3/2016 | Hummelt | B60G 11/08 |
| 2012/0146308 A1* | 6/2012 | Fruhmann | B60G 11/08 |
| | | | 280/124.175 |

FOREIGN PATENT DOCUMENTS

| | | |
|---|---|---|
| JP | 2001-193789 A | 7/2001 |
| JP | 2003-004095 | 1/2003 |
| KR | 10-1998-0038535 | 8/1998 |
| KR | 10-0334271 | 4/2002 |

* cited by examiner

COMPRESSION-TYPE MASS DAMPER, AND SUSPENSION SYSTEM AND VEHICLE USING THE SAME

CROSS-REFERENCE TO RELATED APPLICATION

This application claims under 35 U.S.C. § 119(a) the benefit of Korean Patent Application No. 10-2015-0177944, filed on Dec. 14, 2015, the entire contents of which are incorporated by reference herein.

BACKGROUND (a) Technical Field

The present invention relates to a mass damper which reduces a resonant phenomenon of a vehicle; and more particularly, to a compression-type mass damper which is fixed to an outer surface of a target in a pressing manner, and a suspension system and a vehicle using the same.

(b) Description of the Related Art

Generally, NVH (noise, vibration, harshness) of vehicles are factors which must be reduced so as to meet governmental regulations, such as the following European regulations (with decibel levels indicated): EU#1 (92 dB), EU#9 (81 dB), and EU#6 (78 dB).

As an example of efforts for reducing NVH, there is a method in which a mass damper formed by coupling a mass made of rubber or urethane with a bracket is mounted to a drive system, a vehicle body connection part, or an exhaust system.

For example, in a method of mounting the mass damper to the drive system, the mass damper is mounted on an axle housing, so that the magnitude of vibration of the axle can be reduced by vibration absorption of the mass damper. In a method of mounting the mass damper to the vehicle body connection part, the mass damper is mounted on the junction between a chassis and a vehicle body, so that the magnitude of vibration of the vehicle body can be reduced by vibration absorption of the mass damper. In a method of mounting the mass damper to the exhaust system, the mass damper is mounted on an exhaust pipe, so that the magnitude of vibration of the exhaust pipe can be reduced by vibration absorption of the mass damper.

As such, use of the mass damper which is mounted on a vibration source or a vibration transfer path assists in reducing NVH to meet the European regulations such as EU#1 (92 dB), EU#9 (81 dB), and EU#6 (78 dB).

However, NVH is characterized in that it is exacerbated by a resonance phenomenon of a vibration source derived from a road and a vibration source derived from the engine/drive system. In particular, a suspension system is a basic structure for coupling the vehicle body with the chassis and acts as a path through which vibration amplified by resonance is transmitted. Therefore, it is difficult to meet the European regulation, such as EU#1 (92 dB), EU#9 (81 dB), and EU#6 (78 dB) only using the mass damper.

Further, the suspension system employs a bushing similar to the mass damper so as to adjust the stiffness of the junction between the vehicle body and a suspension component and thus reduce vibration, but it is ineffective in avoiding influence of a resonant frequency of vibration transmitted from the road or influence of a resonant frequency of vibration generated from the engine/drive system and transmitted to the vehicle body.

SUMMARY

The present invention is directed to a compression-type mass damper which is coupled with a component of a suspension system in a pressing manner, and in particular, is able to avoid, without reducing the stiffness of the suspension system, the influence of a resonant frequency of vibration transmitted from the road and a resonant frequency of vibration generated from an engine/drive system and transmitted to a vehicle body, and to a suspension system and a vehicle using the same.

In accordance with an embodiment of the present invention, there is provided a compression-type mass damper including: a damping mass formed with an open space, the damping mass enclosing an outer surface of a target through the open space and absorbing vibration of the target; a weight body enclosed by the damping mass, the weight body applying weight to the damping mass; and a compression plate enclosed by the damping mass, the compression plate applying a fixing force to the open space.

The damping mass may be made of elastic material, and the weight body and the compression plate may be made of metal. The weight body and the compression plate may be formed along with the damping mass by injection molding.

The damping mass may include: a compression body having the open space and provided with the compression plate; a mass body including the weight body over the open space; and an elastic body integrally coupling the compression body with the mass body and absorbing the vibration. The compression body may be provided with a plurality of protrusions. The protrusions and may be exposed to the open space and brought into contact with the target.

The elastic body may have a reversed trapezoidal cross-section extending from the mass body to the compression body and be formed with a void having a reversed trapezoidal cross-section.

The weight body may have a shape corresponding to a shape of the mass body and be formed with a mass charging space which may be changed in size and shape to adjust the weight of the weight body.

The compression plate may have a shape corresponding to that of the compression body.

A damper stud may pass through the damping mass and be fixed to the compression plate to restrict separation of the weight body. The damper stud may pass both through a stud passing hole that is concentric with a stud receiving space of the mass body and through a shaft hole of the weight body, and be fixed to a stud fixing hole of the compression plate. The damper stud may be fixed to the stud fixing hole by a fixing boss that is provided on an end of a stud shaft passing through the stud passing hole and the shaft hole.

In accordance with an embodiment of the present invention, there is provided a suspension system including: a compression-type mass damper having a damping mass configured to absorb vibration, a weight body applying weight to the damping mass, a compression plate applying a fixing force to an open space of the damping mass, and a damper stud passing through the damping mass and fixed to the compression plate; and a leaf spring to which the compression-type mass damper is fixed in such a way that the leaf spring is enclosed by the compression-type mass damper in a lateral direction of the leaf spring.

The leaf spring includes an eye part provided with a bushing, and the compression-type mass damper may be fixed to a portion of the leaf spring other than the eye part.

According to the present invention, a vehicle may include:

a compression-type mass damper including a damping mass configured to absorb vibration, a weight body applying weight to the damping mass, a compression plate applying a fixing force to an open space of the damping mass, and a damper stud passing through the damping mass and fixed to the compression plate; and a suspension system including a leaf spring to which the compression-type mass damper is fixed in such a way that the compression-type mass damper encloses an outer surface of the leaf spring, the suspension system being configured to avoid, using the compression-type mass damper, influence of a resonant frequency of vibration transmitted from a road and a resonant frequency of vibration generated from an engine and a drive system and transmitted to a vehicle body.

A rear axle configured to transmit power to a wheel mounted with the suspension system may include a bolt-type mass damper coupled to the rear axle by a bolt. The bolt-type mass damper may be configured to absorb vibration of the rear axle.

In the present invention, a mass damper for reducing vibration is compressed onto and integrally fixed to a component of a suspension system in a pressing manner, and thus realizes the following advantages and effects.

First, because the mass damper is directly mounted to the suspension system, it can reliably avoid influence of a resonant frequency of vibration transmitted from the road and a resonant frequency of vibration generated from an engine/drive system and transmitted to a vehicle body. Second, the mass damper is mounted to the suspension system by pressing, thus avoiding a problem of load concentration on a bolt coupling part which is caused in a bolt-type mass damper. Third, because a body part of a leaf spring of the suspension system is used, the stiffness of a spring eye, which couples the leaf spring to the vehicle body, can be maintained. Fourth, the vibration absorption performance of the suspension system can be markedly enhanced, whereby the R&H (ride and handling) performance of the vehicle can be maximized Fifth, because an NVH reduction rate of the vehicle by the suspension system can be markedly increased, the present invention can meet governmental regulations, such as the European regulations of EU#1 (92 dB), EU#9 (81 dB), and EU#6 (78 dB).

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
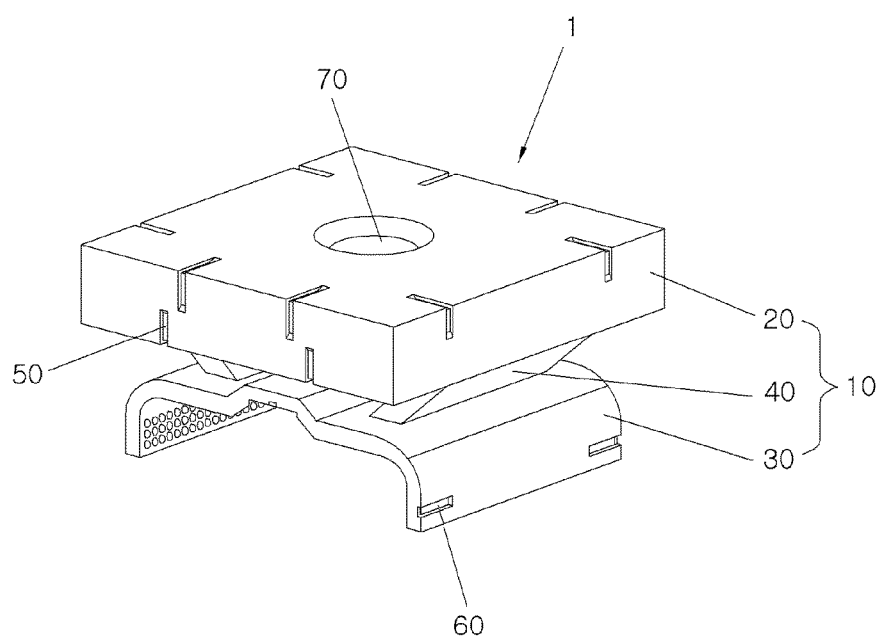
FIG. 1 is a perspective view of a compression-type mass damper according to an embodiment of the present invention.
Figure 2:
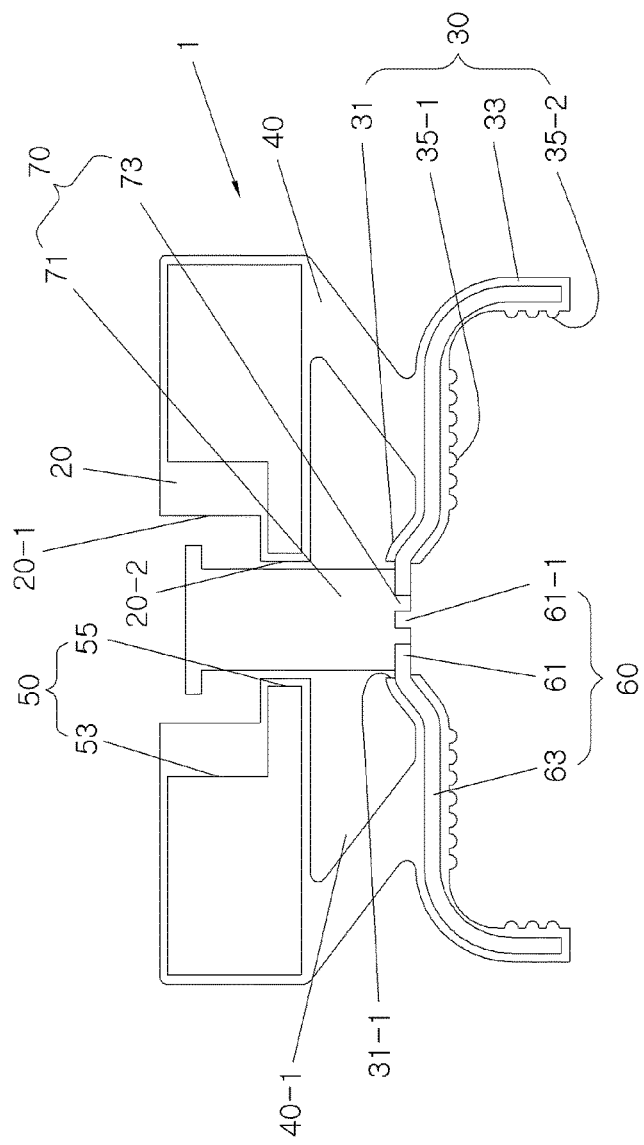
FIG. 2 is an assembled sectional view of the compression-type mass damper according to the present invention.

FIGS. 1 and 2 illustrate a compression-type mass damper according to an embodiment of the present invention.

Referring to FIG. 1, the compression-type mass damper 1 includes a damping mass 10 which performs a damping function through vibration absorption, a weight body 50 which retains an upper shape of the damping mass 10 and applies weight to the damping mass 10, a compression plate 60 which retains a lower shape of the damping mass 10 and applies a fixing force to the damping mass 10 that is compressed by a target element, and a damper stud 70 which is inserted into the damping mass 10 and fixes the weight body 50 and the compression plate 60 to the damping mass 10.

Referring to FIG. 2, the damping mass 10 is divided into a mass body 20 which forms an upper portion of the damping mass 10, a compression body 30 which forms a lower portion of the damping mass 10, and an elastic body 40 which forms an intermediate portion of the damping mass 10. The damping mass 10 is made of elastic material such as rubber for elastic compressive deformation. Particularly, the damping mass 10 is integrally formed with the weight body 50 and the compression plate 60 by injection molding.

In an embodiment, the mass body 20 has, in a central portion thereof, a stud receiving space 20-1 and a stud passing hole 20-2 which are concentrically formed. The mass body 20 has an approximately rectangular parallelepiped structure having a predetermined thickness and encloses the damper body 50. In particular, the stud receiving space 20-1 is formed by removing a central portion of the mass body 20 in a circular shape and is used as space in which the damper stud 70 is received. The stud passing hole 20-2 passes through a portion of the mass body 20 that is not formed with the stud receiving space 20-1. The stud passing hole 20-2 is used as a passage through the damper stud 70 is coupled to the compression plate 60.

In an embodiment, the compression body 30 includes an outer body 33 has a planar shape and is integrally formed with the mass body 20 by the elastic body 40. The compression body 30 includes an outer body 33 which forms an open space to enclose and compress the target element. An inner body 31 is formed in a central portion of the open space, and the damper stud 70 is disposed on the inner body 31. Particularly, unlike the outer body 33, the inner body 31 protrudes to enter a void 40-1 that is internal space of the elastic body 40, thus making it possible for the compression plate 60 to be fixed to the damper stud 70 by the protruding portion of the inner body 31. Further, the inner body 31 has a center hole 31-1 therein so that a portion of the compression plate 60 that is fixed with the damper stud 70 can be open through the center hole 31-1. The outer body 33 has protrusions on an inner surface thereof so that when the outer body 33 is compressed onto the target element, contact force therebetween can be enhanced. In an embodiment, the protrusions include bottom protrusions 35-1 which protrude from a bottom surface of the outer body 33, and side protrusions 35-2 which protrude from a side surface of the outer body 33. The bottom protrusions 35-1 and the side protrusions 35-2 are protrusions which are arranged in a row, and each of which has a hemispherical, rectangular, trapezoidal or triangular cross-section.

In an embodiment, the elastic body 40 integrally couples the mass body 20 with the compression body 30, and has the void 40-1, which is a hollow space, to facilitate elastic deformation due to a load. Particularly, the elastic body 40 has a reversed trapezoidal cross-section in which a side thereof adjacent to the mass body 20 is longer than a side thereof adjacent to the compression body 30. Thereby, the void 40-1 also forms the hollow space having a reversed trapezoidal cross-section.

Figure 3:
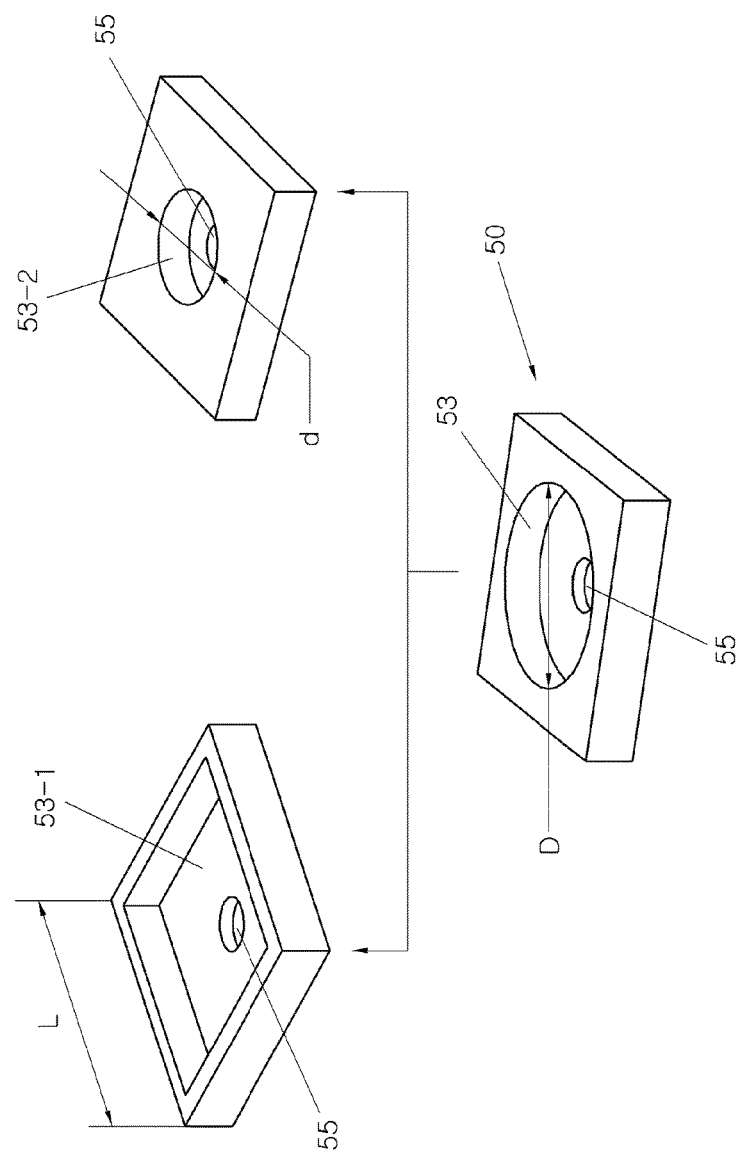
FIG. 3 is a view illustrating modifications of the compression-type mass damper according to the present invention.

Referring to FIG. 2, the weight body 50 is made of metal and has a rectangular parallelepiped shape with a predetermined thickness. The weight body 50 has in a central portion thereof a mass charging space 53 and a shaft hole 55 and is integrally formed with the mass body 20 by injection molding in such a way that the weight body 50 is enclosed by the mass body 20. The mass charging space 53 is formed by removing a central portion of the damper body 50 in a predetermined shape and is provided as space in which the stud receiving space 20-1 of the damping mass 10 is formed. The shaft hole 55 passes through a portion of the damper body 50 that is not formed with the mass charging space 53 and thus is provided as space in which the stud passing hole 20-2 of the damping mass 10 is formed. The mass charging space 53 may be modified into one of those depicted in FIG. 3. As shown in FIG. 3, with regard to the weight body 50, based on the mass charging space 53 that is formed in a circular shape with a standard diameter D, it may be modified into a large mass charging space 53-1 which is formed in a square shape with a predetermined side length L, or a small mass charging space 53-2 which is formed in a circular shape with a reduced diameter d smaller than the standard diameter D. Therefore, the mass charging space 53 has a volume less than that of the large mass charging space 53-1 but greater than the small mass charging space 53-2. Thereby, the weight of the weight body 50 can be adjusted.

Referring to FIG. 2, the compression plate 60 is made of a metal plate and is integrally formed with the compression body 30 by injection molding in such a way that the compression plate 60 is enclosed by the compression body 30. The compression plate 60 includes a stud fixing body 61 which forms an internal structure to which the damper stud 70 is fixed, and a deformable body 63 which is compressed onto the target element and thus exerts fixing force. Particularly, the stud fixing body 61 is fixed to the damper stud 70 through the stud fixing hole 61-1 and is disposed, along with the inner body 31 of the compression body 30, in the void 40-1 that is the internal space of the elastic body 40.

Referring to FIG. 2, the damper stud 70 includes a large-diameter flange which is concentrically provided on a first end of the damper stud 70, and a stud shaft 71 which is provided on a second end thereof and has a predetermined length with a fixing boss 73 protruding from the stud shaft 71. Particularly, the length of the stud shaft 71 is a predetermined length at which, when the damper stud 70 is assembled with the damping mass 10, the stud shaft 71 is prevented from being exposed out of the damping mass 10. Further, the diameter of the fixing boss 73 is a diameter enough for the fixing boss 73 to be forcibly fitted into the stud fixing hole 61-1 of the compression plate 60 so that the force of fastening the fixing boss 73 to the compression plate 60 is formed. A slit is formed in the fixing boss 73 so as to enable the fixing boss 73 to be elastically deformed. Therefore, when the elastic body 40 is damaged by external impact or malfunction, the damper stud 70 also function to retain the coupling of the weight body 50 to the compression plate 60 so that the weight body 50 can be fixed in place.

Figure 4:
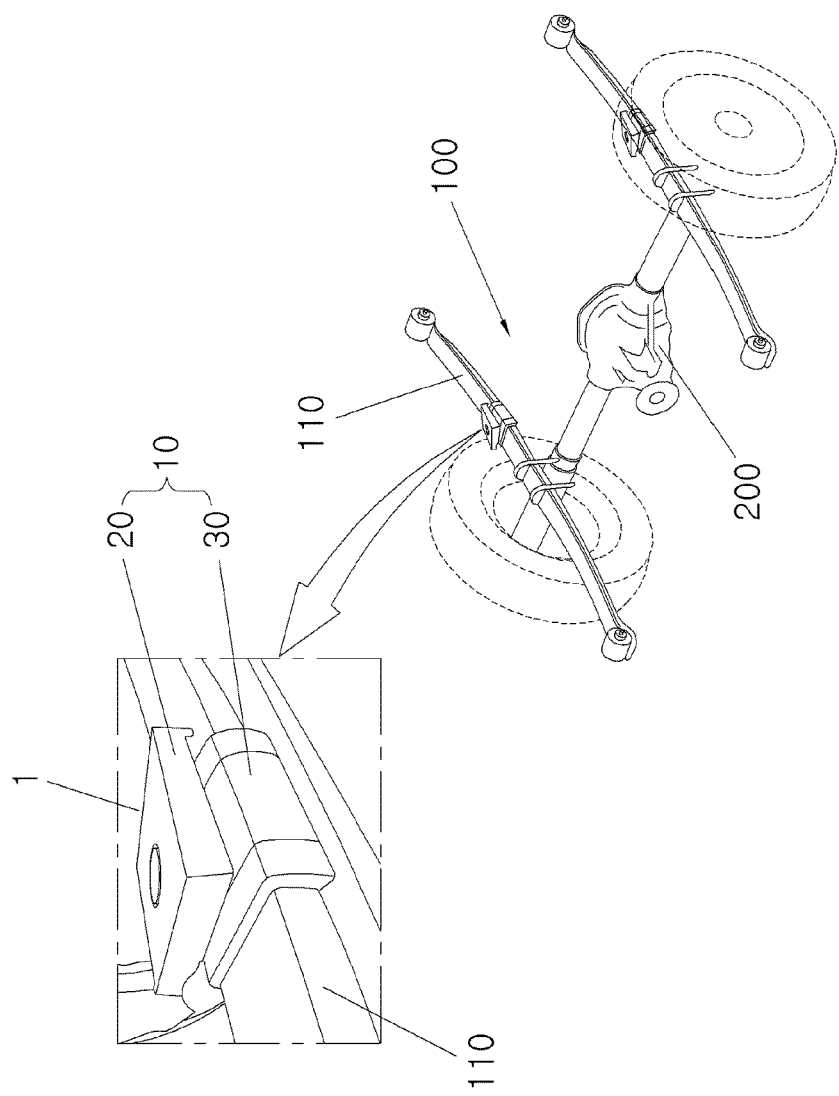
FIG. 4 is a view showing the configuration of a suspension system using the compression-type mass damper according to the present invention.

FIG. 4 illustrates an example of a suspension system to which the compression-type mass damper 1 is applied. As shown in FIG. 4, the suspension system 100 is a suspension system for a commercial vehicle which is installed adjacent to each of left and right wheels that receive power from a rear axle 200. The suspension system 100 includes a leaf spring 110 provided with the compression-type mass damper 1. The compression-type mass damper 1 of FIG. 4 is the same as the compression-type mass damper 1 that has been described with reference to FIGS. 1 to 3. Therefore, the compression body 30 is compressed onto the leaf spring 110 in such a way that the compression body 30 encloses the leaf spring 110 in the lateral direction of the leaf spring 110. Thereby, the fixing force by which the damping mass 10 and the leaf spring 110 are fixed with each other can be enhanced by compression force that is applied from the compression plate 60 to the leaf spring 110.

Figure 5:
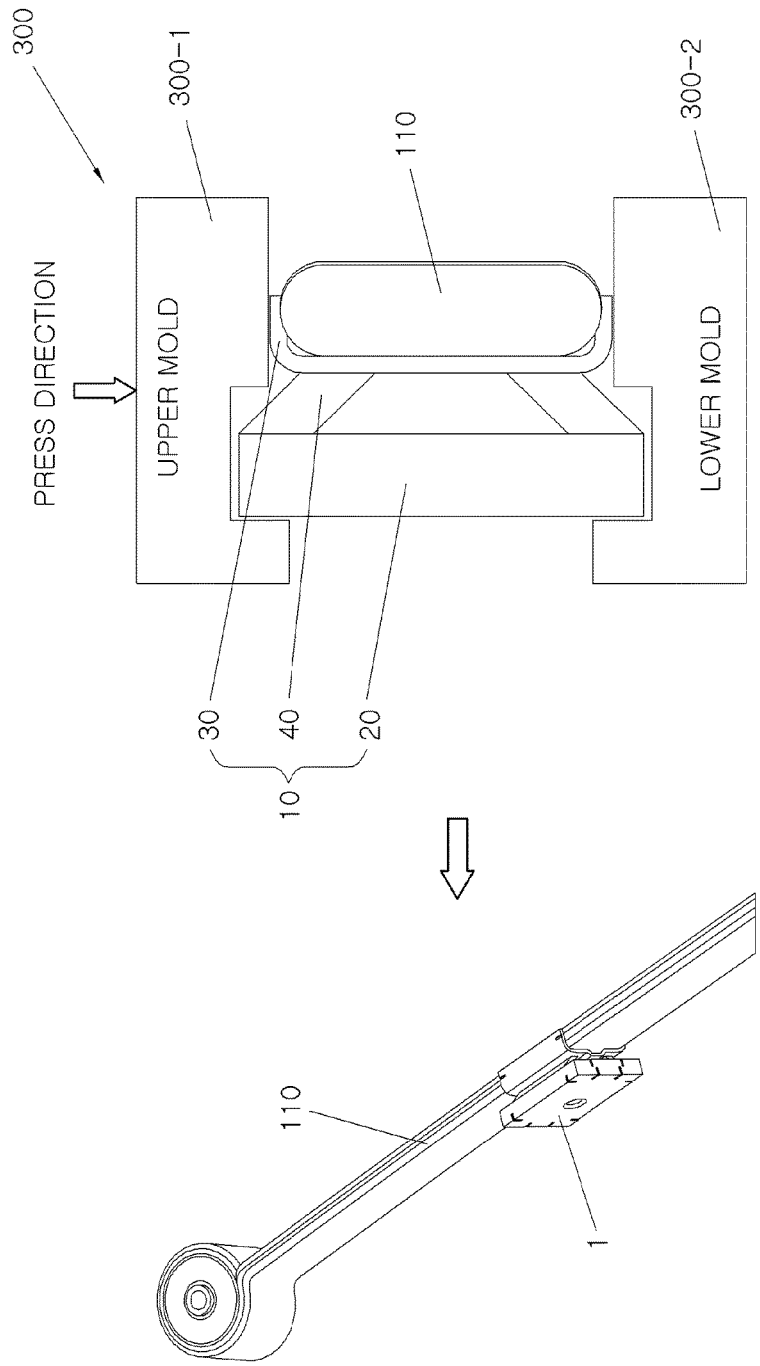
FIG. 5 is a view illustrating press-assembly of a leaf spring and the compression-type mass damper according to the present invention.

Particularly, the compression between the damping mass 10 and the leaf spring 110 can be realized by a press machine. Referring to FIG. 5, the damping mass 10 and the leaf spring 110 are temporarily assembled with each other such that the compression body 30 encloses the leaf spring 110 in the lateral direction. Thereafter, the temporarily assembled intermediate product is placed on its side and then disposed on a lower mold 300-2 of the press machine 300. Subsequently, an upper mold 200-1 is moved onto the lower mold 300-2. Then, the compression body 30 and the compression plate 60 are brought into close contact with the leaf spring 110 in the lateral direction and fixed with each other by the pressing force of the upper and lower molds 200-1 and 300-2. In this case, the bottom protrusions 35-1 and the side protrusions 5-2 of the compression body 30 are deformed such that the contact force between the bottom body 30 and the leaf spring 110 is increased. Particularly, the bottom protrusions 35-1 and the side protrusions 35-2 function to prevent the damping mass 10 from being pushed or removed from the original position thereof, even when displacement of the leaf spring 110 is caused by a load applied thereto while the vehicle moves.

Figure 6:
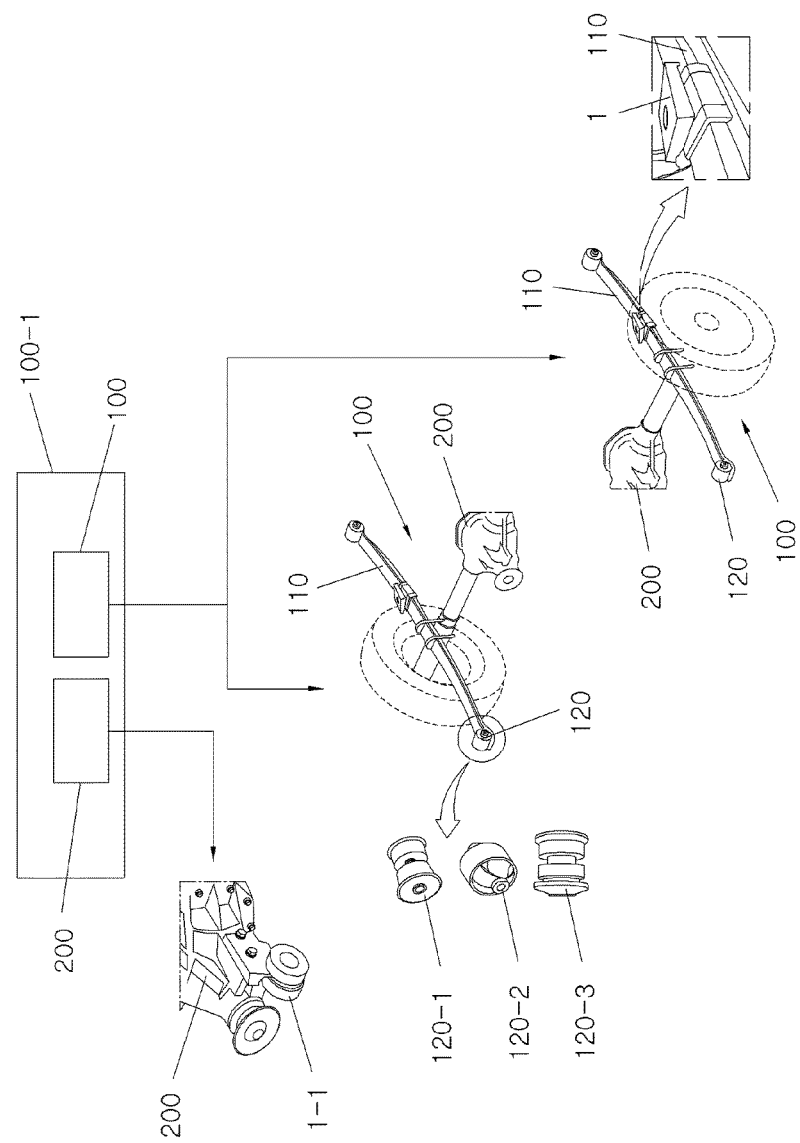
FIG. 6 is a view showing an example of a vehicle including, as a component thereof, the suspension system using the compression-type mass damper according to the present invention that contributes to a reduction in NVH of the vehicle.

FIG. 6 is an example of a vehicle 100-1 including, as a component thereof, a suspension system 100 provided with a compression-type mass damper 1. As shown in FIG. 6, the vehicle 100-1 includes the suspension system 100 which is coupled to a vehicle body at a position adjacent to each of the left and right wheels, a rear axle 200 which transmits power to left and right wheels, and an NVH reduction unit which includes the compression-type mass damper 1, bushings 120-1, 120-2 and 120-3, and a bolt-type mass damper 1-1.

In an embodiment, the compression-type mass damper 1 encloses and compresses the leaf spring 110 in the lateral direction of the leaf spring 110. Therefore, when the suspension system 100 acts as a path through which a resonant frequency of vibration from a road and a resonant frequency of vibration from an engine/drive system is transmitted to the vehicle body after being amplified, the compression-type mass damper 1 prevents the influence of the resonant frequency through the leaf spring 110, thus markedly mitigating the resonant frequency amplification of the suspension system 100. These results have been proven by the result of a practical vehicle test in which noise is reduced by the maximum 14 dB.

In an embodiment, the bushings 120-1, 120-2 and 120-3 are installed in an eye part which is formed on each of both ends of the leaf spring 110. The first, second and third bushings 120-1, 120-2 and 120-3 have different kinds of structures and shapes whereby the stiffness of a vehicle body connection part can be changed such that vibrations can be reduced. In particular, when the first, second and third bushings 120-1, 120-2 and 120-3 are used along with the compression-type mass damper 1, the junction between the vehicle body and the eye part of the leaf spring 110 can be configured such that a change in stiffness thereof is minimized.

In an embodiment, the bolt-type mass damper 1-1 is coupled to the rear axle 200 by a bolt, whereby a resonance phenomenon of a vibration source through the engine/drive system can be avoided on the rear axle 200.

As described above, a compression-type mass damper according to an embodiment of the present invention includes a damping mass 10 which absorbs vibrations, a weight body 50 which applies weight to the damping mass 10, a compression plate 60 which provides fixing force in an open space of the damping mass 10, and a damper stud 70 which is fixed to the compression plate 60 through the damping mass 10. The compression-type mass damper 1 is compressed onto and fixed to an outer surface of a leaf spring 110 in a pressing manner through the open space of the damping mass 10 and thus is used as a component of a suspension system 100. The suspension system 100 is applied to a vehicle 100-1 and is able to avoid, without reduction in stiffness of the suspension system 100, influence of a resonant frequency of vibration transmitted from a road and a resonant frequency of vibration transmitted from an engine/drive system to a vehicle body. In particular, the resonant frequency avoidance of the suspension system 100 leads to a reduction in NVH, thus meeting applicable governmental regulations.

While the present invention has been described with respect to the specific embodiments, it will be apparent to those skilled in the art that various changes and modifications may be made without departing from the spirit and scope of the invention as defined in the following claims.

What is claimed is:

1. A compressive mass damper, comprising:
   a damping mass formed with an open space, the damping mass enclosing an outer surface of a target through the open space and absorbing vibration of the target;
   a weight body enclosed by the damping mass, the weight body applying weight to the damping mass; and
   a compression plate enclosed by the damping mass, the compression plate applying a fixing force to the open space,
   wherein a damper stud passes through the damping mass and is fixed to the compression plate to restrict separation of the weight body.

2. The compressive mass damper of claim 1, wherein the damping mass is made of elastic material, and the weight body and the compression plate are made of metal.

3. The compressive mass damper of claim 1, wherein the weight body and the compression plate are formed along with the damping mass by injection molding.

4. The compressive mass damper of claim 1, wherein the damping mass comprises:
   a compression body having the open space and provided with the compression plate;
   a mass body including the weight body over the open space; and
   an elastic body integrally coupling the compression body with the mass body and absorbing the vibration.

5. The compressive mass damper of claim 4, wherein the compression body is provided with a plurality of protrusions, wherein the protrusions are exposed to the open space and brought into contact with the target.

6. The compressive mass damper of claim 5, wherein each of the protrusions has a hemispherical shape.

7. The compressive mass damper of claim 4, wherein the elastic body has a reversed trapezoidal cross-section extending from the mass body to the compression body and is formed with a void.

8. The compressive mass damper of claim 7, wherein the void has a reversed trapezoidal cross-section.

9. The compressive mass damper of claim 4, wherein the weight body has a shape corresponding to a shape of the mass body and is formed with a mass charging space.

10. The compressive mass damper of claim 9, wherein a weight of the weight body is adjusted by changing size and shape of the mass charging space.

11. The compressive mass damper of claim 1, wherein the compression plate has a shape corresponding to a shape of the compression body.

12. The compressive mass damper of claim 1, wherein the damper stud passes both through a stud passing hole that is concentric with a stud receiving space of the mass body and through a shaft hole of the weight body, and is fixed to a stud fixing hole of the compression plate.

13. The compressive mass damper of claim 12, wherein the damper stud is fixed to the stud fixing hole by a fixing boss that is provided on an end of a stud shaft passing through the stud passing hole and the shaft hole.

14. A compressive mass damper, comprising:
   a damping mass formed with an open space, the damping mass enclosing an outer surface of a target through the open space and absorbing vibration of the target;

a weight body enclosed by the damping mass, the weight body applying weight to the damping mass; and a compression plate enclosed by the damping mass, the compression plate applying a fixing force to the open space, wherein a compression body of the damping mass is provided with a plurality of protrusions which are exposed to the open space and brought into contact with the target.

15. A compressive mass damper, comprising:

a damping mass formed with an open space, the damping mass enclosing an outer surface of a target through the open space and absorbing vibration of the target;

a weight body enclosed by the damping mass, the weight body applying weight to the damping mass; and a compression plate enclosed by the damping mass, the compression plate applying a fixing force to the open space, wherein a weight of the weight body is adjusted by changing size and shape of the mass charging space.

16. A compressive mass damper, comprising:

a damping mass formed with an open space, the damping mass enclosing an outer surface of a target through the open space and absorbing vibration of the target;

a weight body enclosed by the damping mass, the weight body applying weight to the damping mass; and a compression plate enclosed by the damping mass, the compression plate applying a fixing force to the damping mass which is compressed onto the target by a deformation to apply the fixing force to the open space.

17. A suspension system for a vehicle, comprising:

a compressive mass damper as in any one of claims 1, 14, 15, and 16; and a leaf spring to which the compressive mass damper is fixed in such a way that the leaf spring is enclosed by the compressive mass damper in a lateral direction of the leaf spring.

18. The suspension system of claim 17, wherein the leaf spring includes an eye part provided with a bushing, and the compressive mass damper is fixed to a portion of the leaf spring other than the eye part.

19. A vehicle, comprising:

a compressive mass damper as in any one of claims 1, 14, 15, and 16; and a suspension system including a leaf spring to which the compressive mass damper is fixed in such a way that the compressive mass damper encloses an outer surface of the leaf spring, the suspension system being configured to avoid, using the compressive mass damper, influence of a resonant frequency of vibration transmitted from a road and a resonant frequency of vibration generated from an engine and a drive system and transmitted to a vehicle body.

20. The vehicle of claim 19, wherein the suspension system is applied to a commercial vehicle.

21. The vehicle of claim 19, wherein a rear axle configured to transmit power to a wheel mounted with the suspension system includes a bolting mass damper coupled to the rear axle by a bolt, the bolting mass damper being configured to absorb vibration of the rear axle.

* * * * *